United States Patent [19]
Gregory

[11] 3,842,243
[45] Oct. 15, 1974

[54] TEMPERATURE CONTROL SYSTEM FOR PROPORTIONAL ELECTRIC HEATING

[75] Inventor: Robert O. Gregory, St. Louis, Mo.

[73] Assignee: Solitech, Inc., Saint Louis, Mo.

[22] Filed: July 16, 1973

[21] Appl. No.: 379,208

[52] U.S. Cl. ............... 219/497, 219/501, 219/505, 307/41
[51] Int. Cl. ............................................. H05b 1/02
[58] Field of Search ........... 219/501, 499, 497, 504, 219/505; 307/9 AC, 41, 42

[56] References Cited
UNITED STATES PATENTS

| | | | |
|---|---|---|---|
| 3,453,415 | 7/1969 | Hermes et al. | 219/497 X |
| 3,523,182 | 8/1970 | Phillips et al. | 219/501 |
| 3,548,155 | 12/1970 | Rabindran | 219/497 |

*Primary Examiner*—J. D. Miller
*Assistant Examiner*—Fred E. Bell

[57] ABSTRACT

A temperature control system for proportional control of an electrically energized heating element. The control employs a gate-triggerable semiconductor current switching device (triac) for energizing the heating element from an a.c. source. A thermistor senses the temperature in the heated zone, a circuit providing a sense voltage varying as a function of the thermistor's resistance. The sense voltage is compared with a sawtooth signal by a comparator, providing a signal for gating the triac whenever the sense voltage exceeds the sawtooth voltage. The control incorporates provision for developing gating signals out of phase with the a.c. source and a zero-voltage switching feature permitting initial gating of the triac only at zero-crossings of the a.c. source voltage. A thermistor fail-safe provision prevents triac gating in the event of transistor open-circuited or short-circuited conditions to preclude over-temperature or uncontrolled operation of the system.

10 Claims, 1 Drawing Figure

PATENTED OCT 15 1974
3,842,243
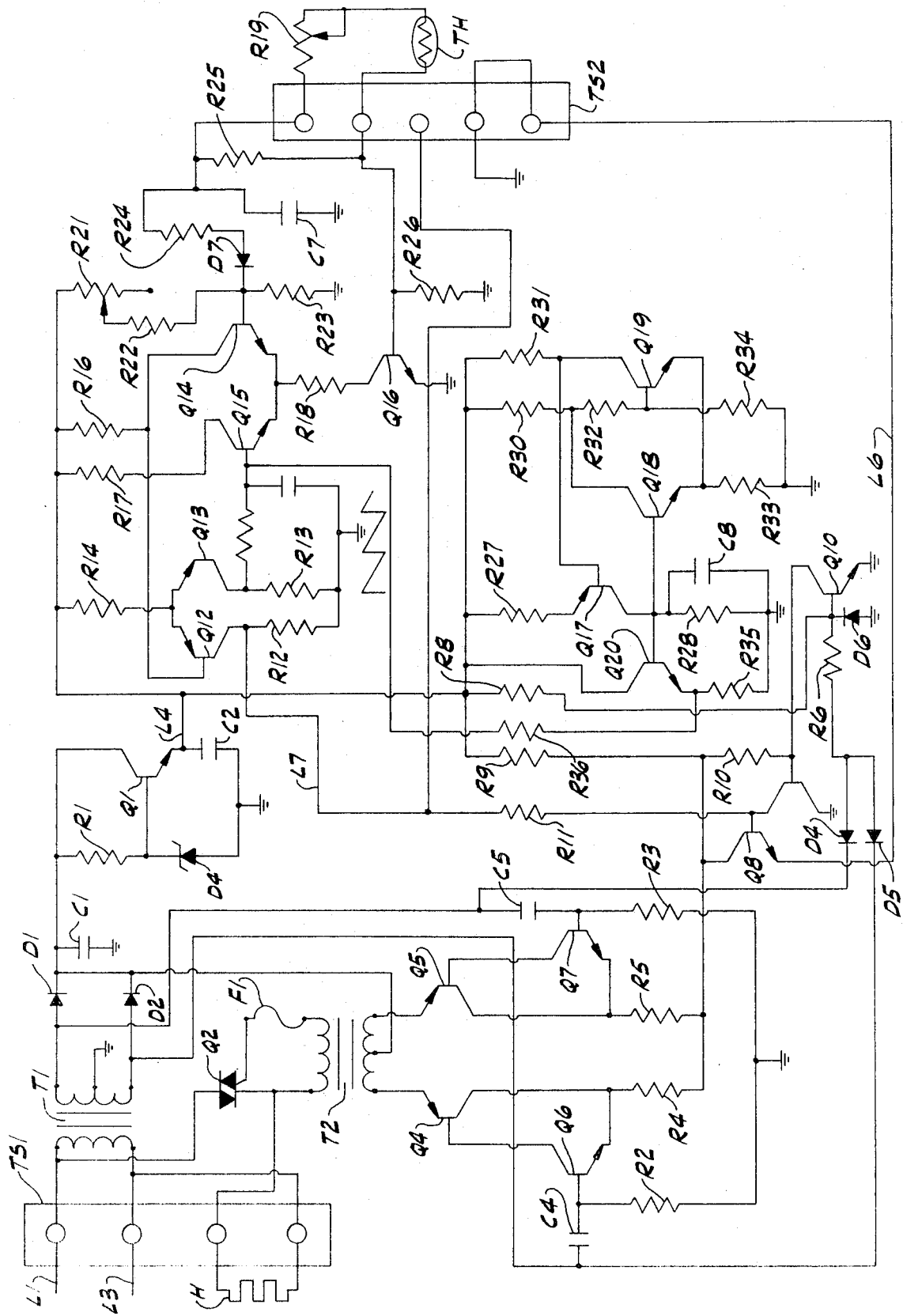

TEMPERATURE CONTROL SYSTEM FOR PROPORTIONAL ELECTRIC HEATING

BACKGROUND OF THE INVENTION

This invention relates to proportional-type temperature control systems and more particularly to such a system for proportional control of an electrically energized heating element.

Proportional temperature control systems as known in the prior art are those in which temperature control is achieved through time-modulated or so-called proportional energization of a thermal element. Generally speaking, proportional control of an electrically energized heating element (electric heater) involves establishing a base time interval and energizing the heater for some a portion of this interval. The time base interval (cycle) is ideally of several seconds duration, noting that if too short, too few cycles of the conventional a.c. source will be available for precise control. If the cycle is too long, the heating elements will heat up and cool down during each cycle. This may result in thermal stresses which reduce heater element life expectancy and may result in undesirably large swings in discharge air temperature.

A control system of the present invention is particularly well-suited for controlling duct heaters of a commercial or industrial type in which the heater takes the form of one or more coils or elements which are enclosed in a duct through which air is continuously forced under pressure Such duct heaters are typically energized from single phase a.c. power of suitable voltage such as 208 v. or three-phase a.c. power such as at 240 v. or 480 v.

Energization of such heating elements is advantageously controlled by using gate-triggerable semiconductor switching devices such as silicon-controlled rectifiers (SCR's) or so-called triacs, i.e., bidirectional triode thyristors. Such solid state devices are silent, reliable and long-lasting in operation. However, to prevent radio interference, it is desirable that these devices be gated (triggered) only when zero voltage is across them, i.e., at zero-crossing of the source of a.c. supply. Moreover, best gating and operation of such devices is assured by gating them with a gating signal which is out of phase with respect the a.c. source voltage. This also reduces or eliminates so-called "dead time," as will be appreciated by those skilled in the art.

It has previously been known to employ controls of the present type employing triacs which are switched under the control of a thermistor which senses the temperature in the heated zone. While ordinarily reliable, such thermistors (or the associated leads connecting them to the control circuitry) may become open-circuited or short-circuited. In either case, the thermistor circuit no longer controls the triac gating. Under some circumstances, an open thermistor circuit, for example, may signal a need for more heat. This could result in an overheating condition which would be terminated only by operation of thermal cutout or other electro-mechanical protective devices. More desirably, however, the control itself should deenergize the heater should the thermistor (or its associated leads) become open-circuited or short-circuited, without the need to rely on proper operation of ultimate protection devices.

SUMMARY OF THE INVENTION

Among the several objects of the invention may be noted the provision of an improved temperature control system for proportional control of an a.c. energized heating elements; the provision of such a control system employing zero-voltage switching of gate-triggerable semiconductor switching devices and out-of-phase gating of the devices; the provision of such a control system employing thermistor sensing and which is fail-safe in operation by preventing energization of the heating element if the thermistor circuit becomes open-circuited or short-circuited; the provision of such a control-system which provides fully proportional control through switching over 0 to 100 percent of the time base interval; and the provision of such a control system which provides highly precise temperature response, silent operation, and reliable, longlasting operation.

Briefly, the invention involves a temperature control for proportional control of at least one electrically energized heating element which includes a gate-triggerable semiconductor current switching device adapted for being gated to energize the element from an a.c. voltage source. A thermistor senses the temperature in a zone heated by the element, the thermistor having a resistance which varies as a predetermined function of the temperature in the zone circuit means is interconnected with the thermistor for providing a so-called sense voltage varying as a function of the thermistor's resistance. Means is included for providing a periodically varying voltage (e.g., a sawtooth waveform). A comparator compares the instantaneous magnitude of the sense voltage and periodically varying voltage, providing a signal for causing gating of the switching device when a predetermined relationship exists between the magnitudes of the sense and varying voltages. Fail-safe circuitry is interconnected with the comparator and the thermistor for preventing said signal from being provided if the thermistor is either open-circuited or short-circuited (by this is meant an open or a short in the circuit which includes the thermistor). Accordingly, the arrangement is such that energization of the heating element in proportionally controlled in response to temperature sensed in the zone through normal operation of the thermistor.

Other objects and features will be in part apparent and in part pointed out hereinafter.

BRIEF DESCRIPTION OF THE DRAWING

The single FIGURE is a schematic circuit diagram of a control system of the invention.

DESCRIPTION OF THE PREFERRED EMBODIMENT

Referring now to the drawing, a temperature control system of the invention is supplied with single-phase a.c. power of suitable line voltage such as 208 v. by a pair of power leads L1 and L3 which are connected by means of a terminal strip TS1. The a.c. line voltage is stepped down by a transformer T1 such as 12 v. with respect to the center tap of the secondary winding. This low level a.c. voltage is rectified by a pair of diodes D1 and D2 and the resultant d.c. voltage is filtered by a capacitor C1 and supplied to a conventional voltage regulating circuit comprising an NPN transistor Q1, a zener diode D4, a resitor R1 and a capacitor C2, across which appears a suitably regulated d.c. voltage which is supplied to other portions of the circuitry via a lead L4.

At H is represented a resistive heating element representative of the one or more elements of the type used in a commercial or industrial duct heater of a conventional type. Such elements are ohmically heated by energization from a.c. line voltage. It will be understood that air is suitably ducted past heating element H under pressure for heating a predetermined zone such as a room. Heating element H is connected to terminal strip TS1 and its energization is controled by a triac Q2 whose main terminals are connected in series with heater element H between power leads L1 and L3 so as to energize the element when the triac is gated (triggered) by a suitable gating signal supplied to its gate terminal through a small fuse F1 by the secondary winding of a transformer T2 forming part of a triac driver circuit.

The triac driver circuit is adapted to supply a square wave gating signal for triac Q2 which is out of phase with respect to the a.c. line voltage. This circuit includes a first pair of PNP switching transistors Q4 and Q5 which are Darlington-coupled to respective NPN switching transistors Q6 and Q7. The primary winding center tap of transformer T2 receives the unregulated rectified d.c. signal. The bases of transistors Q6 and Q7 receive the stepped down a.c. signal across the secondary winding of transformer T1 through respective capacitors C4 and C5 and resistors R2 and R3 are connected between the circuit ground and the respective bases of transistors Q6 and Q7 so that the latter transistors are alternately biased with voltage having 90° leading phase relationship to a.c. line voltage. The collectors of transistors Q4 and Q5 (and emitters of transistors Q6 and Q7) are connected through respective resistors R4 and R5 to the collector of a PNP switching transistor Q8 of a zero-crossing detector circuit.

The zero-crossing circuit includes further NPN transistors Q9 and Q10 configured so as to prevent transistor Q8 from becoming conductive for causing gating of the triac until an initial zero-crossing of the a.c. line voltage. It will be noted that the emitter of transistor Q8 is connected to circuit ground via a lead L6 and through a jumper across a pair of terminals of a second terminal strip TS2. The jumper may be removed and a remote air-flow detector switch (for sensing air flow through the duct heater) or similar protective device may instead be connected to these terminals, it being understood that such protective switch must be closed for current to be conducted through transistor Q8 for causing gating of the triac.

The anodes of a pair of diodes D4 and D5 are connected through a resistor R6 to the base of transistor Q10 while a further diode D6 is connected between the base and circuit ground. The cathodes of diodes D4 and D5 are connected across respective sides of the secondary winding of transformer T1. Accordingly, it will be seen that transistor Q10, which receives base bias supply through a resistor R8, is normally nonconductive except at zero-crossings of the a.c. line voltage at which point the voltage at the base of transistor Q10 goes from about 0.6 v. negative to about 0.6 positive. When transistor Q10 becomes conductive, base drive for transistor Q9 through resistors R9 and R10 is "robbed" to permit transistor Q9 to become nonconductive thereby to permit transistor Q8 from being driven into saturation by a heat demand signal received through a lead L7 and a resistor R11 from a comparator output circuit.

The comparator output circuit comprises a pair of PNP transistors Q12 and Q13 having respective collector load resistors R12 and R13 and sharing a common emitter resistor R14. Transistors Q12 and Q13 effectively provide balanced amplified output from a differential pair of NPN transistors Q12 and Q13, respectively, and operating as a differential comparator for comparing the instantaneous magnitudes of signals on the respective bases of transistors Q14 and Q15.

For this purpose, transistors Q14 and Q15 have respective collector load resistors R16 and R17 and their emitters are connected in common and through a resistor R18 and the collector-emitter circuit of a normally conductive NPN transistor Q16 to the circuit ground. The arrangement is such that a heat demand signal is supplied by lead L7 because of the voltage developed across resistor R12 whenever a periodically varying voltage at the base of transistor Q12 is less than a sense voltage at the base of transistor Q13. It may be noted that the heat demand signal on lead L7 is also made available at the center terminal of terminal strip TS2 so that additional heating units can be slaved to the present control.

The sense voltage is provided by circuitry interconnected with a thermistor TH connected by leads to terminal strip TS2 and suitably positioned in the heated zone for sensing the temperature in the zone. The sense voltage varies as an inverse function of the resistance of thermistor TH. For this purpose, thermistor TH has a negative thermal coefficient of resistivity (NTC) of a fairly linear characteristic and is preferably calibrated for a resistance of about 2,250 ohms. A trim resistance R10 as shown may be used to obtain this value.

Thermistor TH forms part of a resistance network comprising a potentiometer R21, resistors R22, R23, R24, R25 and R26 (including an isolation diode D8 and a relatively large capacitor C7) which provide a voltage divider so that the sense voltage increases as the zone temperature causes increase of the resistance of the thermistor. Potentiometer R21 provides "set point" adjustment so as to permit preselection of values of the sense voltage corresponding to respective values of the thermistor resistance and so to permit preselection of a temperature to be maintained in the zone.

The periodically varying voltage is preferably of a sawtooth waveform having a period preferably of about 4 seconds and increasing abrupty from about 3.5 v. to about 3.75 v. and then decreasing substantially linearly over the period to 3.5 v. once more, the voltage then again increasing abruptly to the higher value, ete., in periodic fashion.

This waveform is generated by a circuit comprising a PNP transistor Q17 which, when conductive, permits rapid charging of a capacitor C8 through a resistor R27 and, when conductive, permits much slower discharge of capacitor by a resistor R28. The circuit includes a pair of NPN transistors Q18 and Q19 connected in a Schmitt-type circuit including resistors R30–R34 to provide a rapid switching characteristic because of the shared emitter resistor R33 in which transistors Q18 and Q19 are alternately conductive according to the potential on capacitor C8.

This sawtooth waveform generator includes an emitter-follower circuit comprising an NPN transistor Q20 and resistor R35 supplying the voltage of sawtooth waveform through a resistor R36 to the base of transistor Q15.

Transistor Q16, interconnected as shown with the comparator and with thermistor TH, provides a fail-safe circuit which prevents a heat demand signal from being provided to transistor Q8 in the event of a thermistor open circuit or short circuit condition. It will be understood that by referring to the thermistor as open-circuited or short-circuited it is meant to include the possibility of an open or short circuit either in the thermistor or in its associated leads. If there should be an open-circuited condition, transistor Q16 will be deprived of base drive and will become nonconductive. Under this condition, no current will be conducted by either of transistors Q14 and Q15. Hence, no heat demand signal can be supplied. Similarly, a short-circuited condition will have the result of causing the sense voltage to drop sufficiently that transistors Q14 and Q12 are nonconductive so that no heat demand signal can be supplied.

In operation, closed loop temperature control is seen to be provided by the system. If the zone temperature is too low, the sense voltage provided to transistor Q14 will be higher than the greatest instantaneous magnitude of the sawtooth voltage provided to transistor Q15. Thus, a heat demand signal will be supplied to transistor Q8. The latter does not conduct until an initial zero-crossing of the a.c. line voltage is detected and transistor Q9 becomes conductive. Once conductive, however, transistor Q8 robs base drive for transistor Q9. With transistor Q8 in its saturated made of opeation, the gate driver circuit causes out-of-phase gating of triac Q2 during the first and third quadrants, as is desirable. Heating element H is thereby continuously energized to cause full-capacity heating in the zone.

As the zone temperature increases, the sense voltage decreases so that the sawtooth voltage will be greater than the sense voltage for at least a portion of the sawtooth cycle of 4 seconds. During this portion of the cycle, the heat demand signal causes gating of the triac. Gating of the triac is then proportionally controlled as needed to maintain the zone temperature at the desired level. As will be seen, the "on" period increases automatically as the temperature in the zone decreases, and vice versa.

Should the zone temperature be much higher than that selected, the sense voltage will have a mmagnitude less than even the lowest instantaneous magnitude of the sawtooth voltage. Hence, no heat demand signal will be provided and the heating element will not be energized by the triac.

In view of the foregoing, it will be seen that the objects of the invention are achieved and other advantages are obtained.

Various changes can be made in the circuit described without departing from the scope of the invention. For example, the circuit may be adapted for operation from three-phase rather than single phase a.c. power by using a pair of triacs and a pair of gate driver circuits of the type described.

Accordingly, it is intended that the foregoing description be interpreted as illustrative rather than in a limiting sense.

What is claimed is:

1. A temperature control system for proportional control of at least one electrically energized heating element, comprising:

a gate-triggerable semiconductor current switching device adapted for being gated to energize said heating element from a source of a.c. voltage;

a thermistor for sensing the temperature in a zone to be heated by said heating element, said thermisor having a resistance which varies as a predetermined function of the temperature in said zone;

means interconnected with said thermistor for providing a sense voltage which varies as a function of the resistance of said thermistor;

means for providing a periodically varying voltage;

comparator means for comparing the instantaneous magnitudes of said sense voltage and periodically varying voltage and adapted to provide a signal for causing gating of said switching device when there is a predetermined relationship between the magnitudes of said sense voltage and periodically varying voltage;

fail-safe means interconnected with said comparator means and said thermistor for preventing said signal for causing gating from being provided if said thermistor is either open-circuited or short-circuited, whereby energization of said heating element is proportionally controlled in response to the temperature sensed in said zone through normal operation of said thermistor.

2. A temperature control system as set forth in claim 1 wherein said fail-safe means comprises a transistor interconnected with said comparator means and with said thermistor, said transistor being normally conductive for permitting normal operation of said comparator means and becoming nonconductive for preventing normal operation of said comparator means in response to an open circuit condition of said thermistor.

3. A temperature control system as set forth in calim 1 further comprising driver circuit means for supplying a gating signal for said switching device which is out of phase with respect to said a.c. voltage.

4. A temperature control system as set forth in claim 1 further comprising means for detecting zero-crossings of said a.c. voltage and for permitting said gating signal to be initially supplied to said switching device substantially only at a zero-crossing of said a.c. voltage.

5. A temperature control system for proportional control of at least one electrically energized heating element, comprising:

a gate-triggerable semiconductor current switching device adapted for being gated to energize said heating element from a source of a.c. voltage;

driver circuit means for supplying a gating signal for said switching device which is out of phase with respect to said a.c. voltage;

zero-crossing circuit means for detecting zero-crossings of said a.c. voltage;

first transistor switching means interconnected with said driver circuit means and said zero-crossing circuit means and adapted for permitting said gating signal to be initially supplied to said switching device substantially only at a zero-crossing of said a.c. voltage;

second transistor switching means interconnected with said driver circuit means and adapted for permitting said gating signal to be supplied to said switching device in response to a heat demand signal;

a thermistor for sensing the temperature in a zone to be heated by said heating element, said thermistor having a resistance which varies as a predetermined function of the temperature in said zone;

means interconnected with said thermistor for providing a sense voltage which varies as an inverse function of the resistance of said thermistor;

means for providing a periodically varying voltage;

comparator means for comparing the instantaneous magnitudes of said sense voltage and said periodically varying voltage and adapted to provide said heat demand signal when the magnitude of said sense voltage is instantaneously greater than the magnitude of said periodically varying voltage;

fail-safe means interconnected with said comparator means and said thermistor for preventing said heat demand signal from being provided if said thermistor is either open-circuited or short-circuited, whereby energization of said heating element is proportionally controlled in response to the temperature sensed in said zone through normal operation of said thermistor.

6. A temperature control system as set forth in claim 5 wherein said switching device comprises a bidirectional thyristor.

7. A temperature control system as set forth in claim 5 wherein said comparator means comprises a pair of transistors interconnected as a differential comparator, said sense voltage being supplied to the base electrode of one of said transistor, said periodically varying voltage being supplied to the base electrode of one of the other of said transistors.

8. A temperature control system as set forth in claim 7 wherein the emitter electrodes of said transistors are connected in a common circuit, said fail-safe means comprising a further transistor having its collector-emitter circuit in series with said common circuit and its base electrode connected to said thermistor, said further transistor being normally conductive to permit normal operation of said differential comparator and becoming nonconductive to prevent normal operation of said differential comparator in response to an open circuit condition of said thermistor.

9. A temperature control system as set forth in claim 7 further comprising a selectively variable impedance element connected in a circuit with said thermistor for preselecting values of said sense voltage corresponding to respective values of the resistance of said thermistor, thereby to permit preselection of a temperature to be maintained in said zone by energization of said heating element.

10. A temperature control system as set forth in claim 5 wherein said periodically varying voltage is of a sawtooth waveform of a period substantially greater than the period of said a.c. voltage.

* * * * *